United States Patent
Hamling (10) Patent No.: US 10,627,808 B2
(45) Date of Patent: Apr. 21, 2020

(54) MANAGING MANUFACTURING CAPACITY PLAN PERFORMANCE

(71) Applicant: Daniel T. Hamling, Oceanside, CA (US)

(72) Inventor: Daniel T. Hamling, Oceanside, CA (US)

(*) Notice: Subject to any disclaimer, the term of this patent is extended or adjusted under 35 U.S.C. 154(b) by 116 days.

(21) Appl. No.: 16/016,620

(22) Filed: Jun. 24, 2018

(65) Prior Publication Data

US 2018/0373230 A1 Dec. 27, 2018

Related U.S. Application Data

(60) Provisional application No. 62/524,520, filed on Jun. 24, 2017.

(51) Int. Cl.
| | |
|---|---|
| *G05B 19/418* | (2006.01) |
| *G06Q 30/02* | (2012.01) |
| *G06N 20/00* | (2019.01) |
| *G06N 5/00* | (2006.01) |

(52) U.S. Cl.
CPC .. *G05B 19/41885* (2013.01); *G05B 19/41865* (2013.01); *G06N 5/003* (2013.01); *G06N 20/00* (2019.01); *G06Q 30/0202* (2013.01); *G05B 2219/31413* (2013.01)

(58) Field of Classification Search
CPC ............ G05B 19/418; G05B 19/41865; G05B 19/4188; G05B 19/41885; G05B 2219/31413; G06Q 10/06312; G06Q 10/0639; G06Q 10/06393

See application file for complete search history.

(56) References Cited

U.S. PATENT DOCUMENTS

| | | | | |
|---|---|---|---|---|
| 5,231,567 A * | 7/1993 | Matoba | ............ | G05B 19/41865 700/100 |
| 6,334,095 B1 * | 12/2001 | Smith | .................... | G05B 15/02 700/108 |
| 6,738,736 B1 * | 5/2004 | Bond | ..................... | G06Q 10/10 703/2 |
| 6,876,948 B1 * | 4/2005 | Smith | .................... | G05B 15/02 702/181 |
| 6,889,106 B2 * | 5/2005 | Wei | .................... | G06Q 10/0631 700/100 |
| 7,552,208 B2 * | 6/2009 | Lubrecht | ............. | G06F 11/3442 709/223 |

(Continued)

*Primary Examiner* — John Villecco (57) ABSTRACT

Techniques are presented for implementing predictive models that learn from real-time manufacturing capacity plan performance data to continually improve the accuracy of generated capacity plans. Instances of a plan performance predictive model are generated in response to receiving then-current sets of capacity plan parameters, predicted plan performance parameters, and measured plan performance parameters that correspond to various capacity plans implemented at a manufacturing facility. Modeled plan parameters produced by the continually adjusted instances of the plan performance predictive model are used to generate candidate capacity plans with progressively more accurate predicted plan performance and/or overall behavior. The candidate capacity plans are analyzed at a user device to facilitate selection of a capacity plan to implement at the manufacturing facility.

20 Claims, 8 Drawing Sheets

(56) References Cited

U.S. PATENT DOCUMENTS

| | | | |
|---|---|---|---|
| 8,175,735 B2* | 5/2012 | Wang | G06Q 10/06 700/103 |
| 8,412,555 B2* | 4/2013 | Hamling | G06Q 10/06 705/7.25 |
| 9,230,226 B2* | 1/2016 | Li | G06Q 10/0631 |
| 9,792,568 B2* | 10/2017 | Chen | G06Q 10/06312 |
| 2003/0050817 A1* | 3/2003 | Cargille | G06Q 10/06 705/7.22 |
| 2003/0177160 A1* | 9/2003 | Chiu | G06Q 10/04 718/100 |
| 2003/0225563 A1* | 12/2003 | Gonos | G06Q 10/06 703/22 |
| 2005/0038684 A1* | 2/2005 | Wang | G06Q 10/06 700/100 |
| 2006/0235664 A1* | 10/2006 | Vinberg | G06Q 10/10 703/6 |
| 2008/0167930 A1* | 7/2008 | Cao | G06Q 10/06 705/7.14 |
| 2009/0216598 A1* | 8/2009 | Hamling | G06Q 10/06 705/7.23 |
| 2009/0248186 A1* | 10/2009 | Hamling | G06Q 10/06 700/99 |
| 2010/0076779 A1* | 3/2010 | Hamling | G06Q 10/06 705/301 |
| 2011/0077994 A1* | 3/2011 | Segev | G06Q 10/06 705/7.16 |
| 2014/0278692 A1* | 9/2014 | Marwah | G06Q 10/06312 705/7.22 |
| 2015/0193566 A1* | 7/2015 | Rolia | G06Q 10/0631 703/21 |
| 2016/0019481 A1* | 1/2016 | Roy | G06Q 10/0639 705/7.38 |
| 2017/0017918 A1* | 1/2017 | Sirmokadam | G06Q 10/04 |
| 2017/0091684 A1* | 3/2017 | Elchlepp | G06Q 10/06312 |

* cited by examiner

MANAGING MANUFACTURING CAPACITY PLAN PERFORMANCE

RELATED APPLICATIONS

This present application claims the benefit of priority to co-pending U.S. Patent Application Ser. No. 62/524,520, titled "MANAGING MANUFACTURING CAPACITY PLAN PERFORMANCE", filed Jun. 24, 2017, which is hereby incorporated by reference in its entirety.

FIELD

This disclosure relates to manufacturing planning, and more particularly to techniques for managing manufacturing capacity plan performance.

BACKGROUND

The capacity level of a manufacturing facility has a significant impact on the success of the facility. If the capacity level is insufficient for the demand, the manufacturing facility may dissatisfy and even lose customers. Some capacity planners seek to avoid this outcome by increasing the capacity level so as to mitigate the risk of losing business. However, any capacity that is not being used (e.g., idle capacity) contributes to lower margins and/or profits for the facility. Capacity planners continually seek to improve the performance (e.g., outcomes) of their manufacturing capacity plans so as to achieve a desired balance between the foregoing negative outcomes and/or other objectives and/or constraints.

Unfortunately, legacy techniques for planning manufacturing capacity are deficient at least as pertains to maximizing the performance of manufacturing capacity plans. Specifically, some legacy techniques might establish a manufacturing capacity plan based on some then-current set of information (e.g., current capacity, product demand forecasts, inventory levels, etc.). These techniques then track certain metrics during actual manufacturing operations to determine various measures of performance for the manufacturing capacity plan. For example, the state of certain equipment might be tracked over time to determine a utilization percentage for that equipment. If any of the performance measures are at an undesired level and/or exhibit an undesired trend, however, such techniques are limited as to the actions that can be executed to improve the performance of subsequent capacity plans. In this case, the capacity planner is left to speculate on those actions and/or manually adjust the planning method, which can lead to unexpected negative performance responses. This problem is further exacerbated by the fact there is a substantially changed set of information that is to be considered when performing such subsequent capacity planning, which can also lead to unexpected negative performance responses. A technological solution is therefore needed to efficiently deliver timely adjustments to manufacturing capacity plans so as to improve the performance of the plans.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for managing manufacturing plan performance, which techniques advance the relevant technologies to address technological issues with legacy approaches. More specifically, the present disclosure provides a detailed description of techniques used in systems, methods, and in computer program products for real-time adjustment of manufacturing capacity plans using predictive modeling. Certain embodiments are directed to technological solutions for implementing a predictive model that learns from real-time plan performance data to continually improve the accuracy of generated capacity plans.

The disclosed embodiments modify and improve over legacy approaches. In particular, the herein-disclosed techniques provide technical solutions that address the technical problems attendant to efficiently delivering timely adjustments to manufacturing capacity plans so as to improve the plan performance. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of process modeling as well as advances in various technical fields related to manufacturing operations management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Embodiments in accordance with the present disclosure address the problem of efficiently delivering timely adjustments to manufacturing capacity plans so as to improve the plan performance. Some embodiments are directed to approaches for implementing a predictive model that learns from real-time plan performance data to continually improve the accuracy of generated capacity plans. The accompanying figures and discussions herein present example environments, systems, methods, and computer program products for real-time adjustment of manufacturing capacity plans using predictive modeling.

Overview

Disclosed herein are techniques for implementing a predictive model that learns from real-time plan performance data to continually improve the accuracy of generated capacity plans. In certain embodiments, a set of capacity plan parameters and a set of measured plan performance parameters that correspond to various capacity plans implemented at a manufacturing facility are collected. From the collected parameters, a plan performance predictive model is formed using at least some of the collected parameters. In certain embodiments, earlier predicted performance parameters for the capacity plans are accessed to form the predictive model. Certain modeled plan parameters are derived from the plan performance predictive model. The modeled plan parameters are applied to newly generated candidate capacity plans, thereby facilitating real-time plan performance adjustments. In certain embodiments, the candidate capacity plans are analyzed at a user device to facilitate selection of a capacity plan to implement at the manufacturing facility.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1:
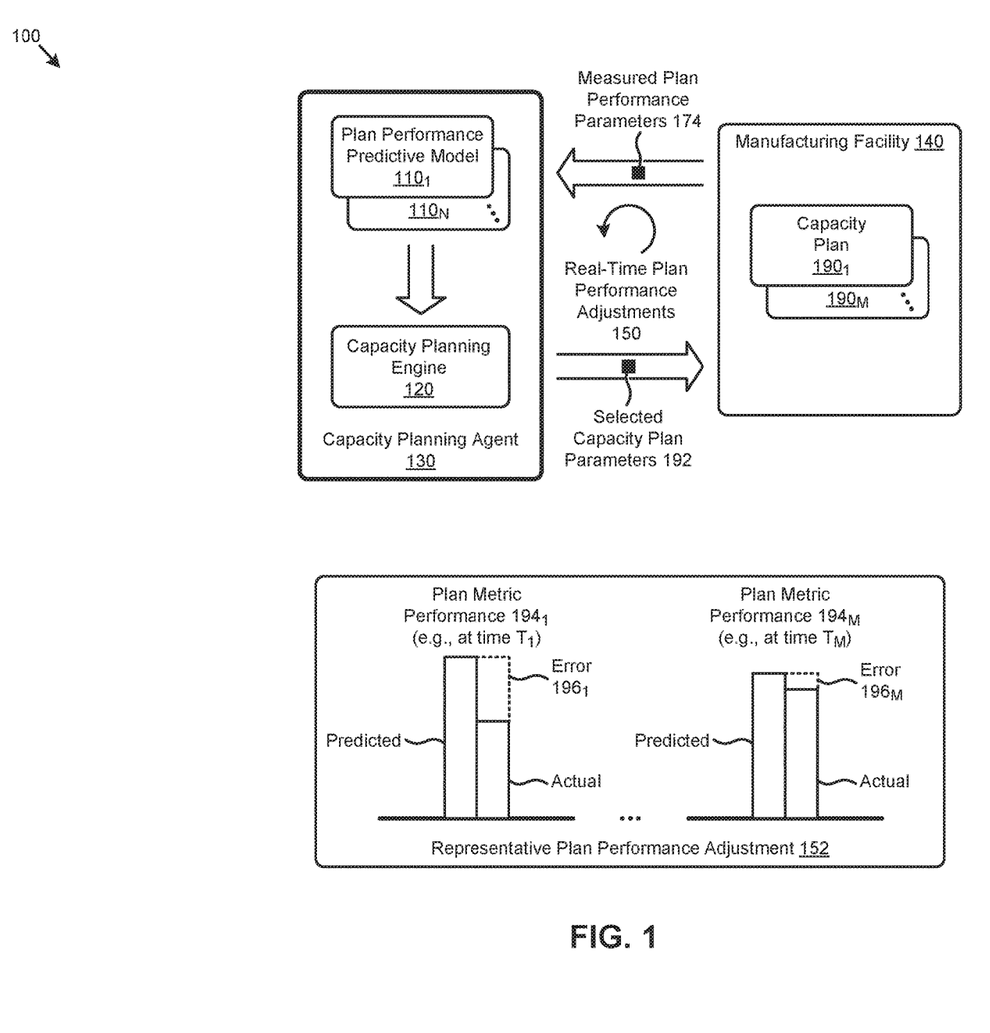
FIG. 1 presents a capacity plan adjustment scenario as performed in systems that facilitate real-time adjustment of manufacturing capacity plans using predictive modeling, according to some embodiments.

FIG. 1 presents a capacity plan adjustment scenario 100 as performed in systems that facilitate real-time adjustment of manufacturing capacity plans using predictive modeling. As an option, one or more variations of capacity plan adjustment scenario 100 or any aspect thereof may be implemented in the context of the architecture and functionality of the embodiments described herein. The capacity plan adjustment scenario 100 or any aspect thereof may be implemented in any environment.

As shown in capacity plan adjustment scenario 100, a capacity planning agent 130 generates capacity plans (e.g., capacity plan $190_1$, . . . , capacity plan $190_M$) that are implemented in a manufacturing facility 140 to facilitate certain manufacturing operations. The capacity plans are described by a set of selected capacity plan parameters 192 that specify certain attributes of a selected (e.g., then-current) capacity plan, such as equipment configurations, material flows, maintenance events, and/or other attributes. The generation of the capacity plans at the capacity planning agent 130 are facilitated by a capacity planning engine 120. In certain embodiments, the capacity planning engine 120 can comprise various specialized algorithms for planning capacity based on certain input information, such as forecasted product demand, product manufacturing requirements, and/or other information.

Further details regarding general approaches to planning manufacturing capacity are described in U.S. Pat. No. 8,412,555 titled "METHODS AND SYSTEMS FOR PLANNING CONFIGURABLE MANUFACTURING CAPACITY", which is hereby incorporated by reference in its entirety.

As earlier mentioned, approaches to planning manufacturing capacity can be deficient at least as pertains to maximizing the performance of the capacity plans executed at a manufacturing facility. The herein disclosed techniques address such deficiencies by implementing a predictive model that learns from real-time plan performance data to continually improve the accuracy of generated capacity plans. Specifically, instances of a plan performance predictive model (e.g., plan performance predictive model $110_1$, . . . , plan performance predictive model $110_N$) are exposed to the capacity planning engine 120 to facilitate generation of the capacity plans to be implemented at manufacturing facility 140. The instances of the plan performance predictive model might correspond to updates to the model based at least in part on the measured performance of the capacity plans as executed at the manufacturing facility 140. Certain information (e.g., modeled plan parameters) produced by a particular instance of the plan performance predictive model is consumed by the capacity planning engine 120 (e.g., by one or more algorithms) to facilitate generation of one or more capacity plans. The capacity planning agent 130 continually receives instances of measured plan performance parameters 174 associated with the then-current capacity plan that can result in updates to one or more instances of the plan performance predictive model that, in turn, facilitate adjustments to the capacity plans generated at the capacity planning engine 120. As such, the herein disclosed techniques facilitate instances of real-time plan performance adjustments 150 responsive to the continually received instances of measured plan performance parameters 174.

An example of such plan performance adjustments is illustrated in a representative plan performance adjustment 152. Specifically, a plan metric performance $\mathbf{194}_1$ at time $T_1$ is described by a bar chart that compares the "predicted" value (e.g., generated by the capacity planning agent 130) and the "actual" value (e.g., measured at the manufacturing facility 140) of a particular performance metric. As an example, the metric might indicate an equipment utilization percentage associated with capacity plan $\mathbf{190}_1$. As shown, an error $\mathbf{196}_1$ exists between the "predicted" value and the "actual" value. For example, the error $\mathbf{196}_1$ might be a result of an underestimation of the time to perform a changeover (e.g., due to a product mix change) at the manufacturing facility 140. In some cases, such errors might result in selection of a capacity plan that is not optimum (e.g., in accordance with specified objectives, constraints, etc.). As earlier described, the herein disclosed techniques facilitate real-time plan performance adjustments (e.g., real-time plan performance adjustments 150) to efficiently deliver timely capacity plan adjustments so as to improve the plan performance (e.g., reduce the difference between actual and predicted plan performance). Specifically, as shown in a plan metric performance $\mathbf{194}_M$ at time $T_M$ that is later than time $T_1$, the error $\mathbf{196}_M$ is decreased as compared to error $\mathbf{196}_1$, and the "actual" measured performance is increased as compared to the actual performance at time $T_1$.

One embodiment of techniques for capacity plan performance management is disclosed in further detail as follows.

Figure 2:
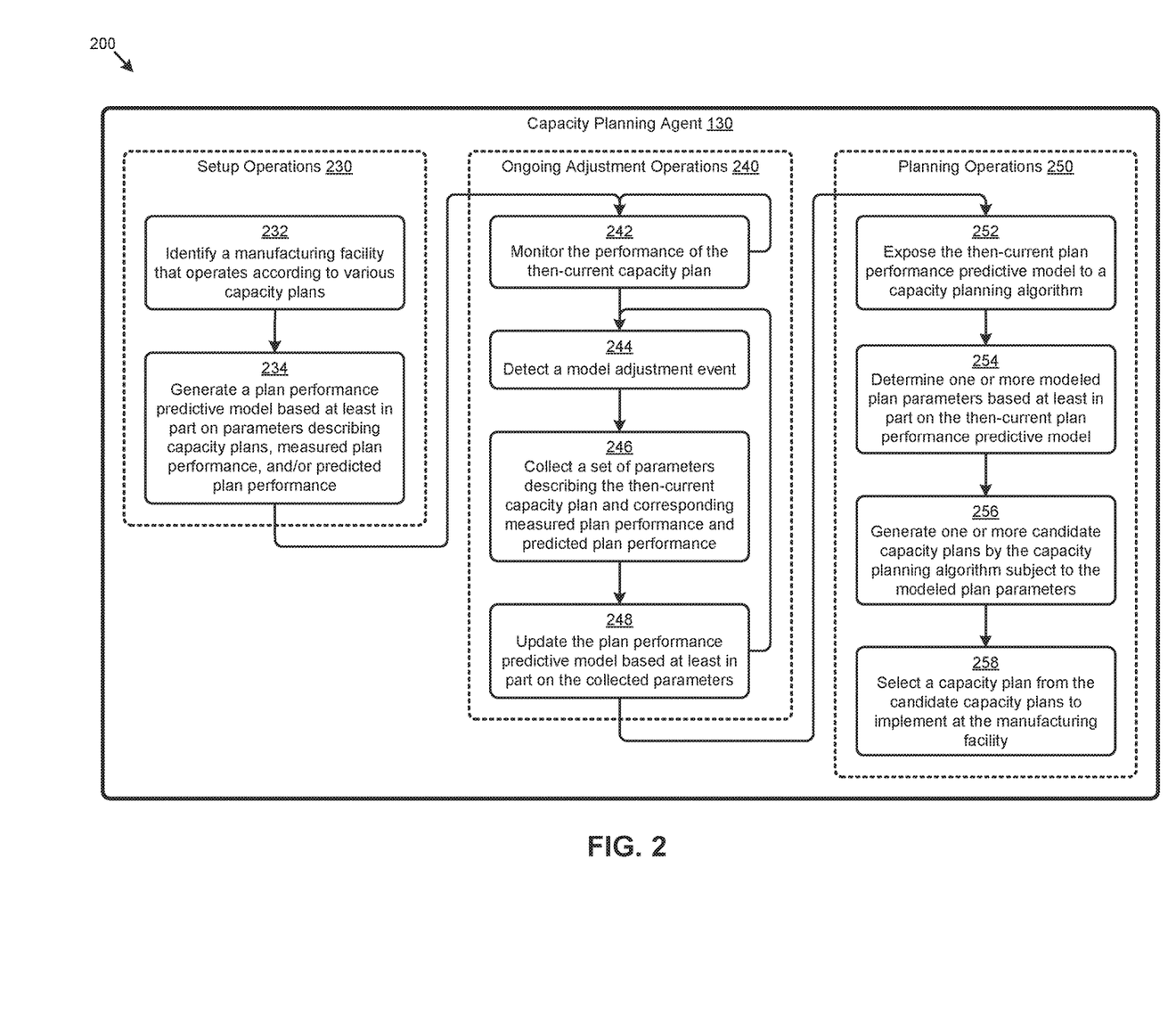
FIG. 2 depicts a capacity plan performance management technique as implemented in systems that facilitate real-time adjustment of manufacturing capacity plans using predictive modeling, according to an embodiment.

FIG. 2 depicts a capacity plan performance management technique 200 as implemented in systems that facilitate real-time adjustment of manufacturing capacity plans using predictive modeling. As an option, one or more variations of capacity plan performance management technique 200 or any aspect thereof may be implemented in the context of the architecture and functionality of the embodiments described herein. The capacity plan performance management technique 200 or any aspect thereof may be implemented in any environment.

The capacity plan performance management technique 200 presents one embodiment of certain steps and/or operations that facilitate real-time adjustment of manufacturing capacity plans using predictive modeling. As shown, the steps and/or operations can be grouped in a set of setup operations 230, a set of ongoing adjustment operations 240, and a set of planning operations 250. In certain embodiments, at least some of these operations can be performed by the capacity planning agent 130. As illustrated, the setup operations 230 of the capacity plan performance management technique 200 can commence by identifying a manufacturing facility that operates according to various capacity plans (step 232). A plan performance predictive model is generated based at least in part on parameters describing capacity plans executed at the manufacturing facility, the measured plan performance of the capacity plans, and/or the predicted plan performance of the capacity plans (step 234). For example, the predicted plan performance of the capacity plans can be predicted by the capacity planning agent 130.

The ongoing adjustment operations 240 shown in FIG. 2 can commence by monitoring the performance of the then-current capacity plan implemented at the manufacturing facility (step 242). Such monitoring can comprises recording a time-series of various parameters (e.g., measurements) associated with performance and/or operations metrics. As can be observed, such metrics can be monitored continually. When a model adjustment event is detected (step 244), a set of parameters are collected that describe the then-current capacity plan and the corresponding measured plan performance and predicted plan performance (step 246). For example, a model adjustment event might be triggered when a certain time period expires and/or a certain number of data points of the monitored performance metrics have been recorded (e.g., so as to represent a statistically significant sample). The plan performance predictive model is updated based at least in part on the collected parameters (step 248).

The planning operations 250 shown in FIG. 2 can commence by exposing the then-current (e.g., updated) plan performance predictive model to a capacity planning algorithm (step 252). One or more modeled plan parameters are determined based at least in part on the then-current (e.g., updated) plan performance predictive model (step 254). For example, the capacity planning algorithm might access one or more of the modeled plan parameters when generating a capacity plan. More specifically, for example, a changeover time value (e.g., in minutes or hours) might be a modeled plan parameter predicted by the then-current plan performance predictive model for use by the capacity planning algorithm. In some cases, a particular modeled plan parameter might be adjusted by the plan performance predictive model based at least in part on time of day, facility location, equipment type, and/or other characteristics of the capacity plan. One or more capacity plans (e.g., candidate capacity plans) are generated by the capacity planning algorithm subject to the modeled plan parameters (step 256). A capacity plan (e.g., selected capacity plan) is then selected (e.g., by a capacity planner) from the candidate capacity plans to implement at the manufacturing facility (step 258).

One embodiment of a computing environment for implementing the capacity plan performance management technique 200 and/or other herein disclosed techniques is disclosed as follows.

Figure 3:
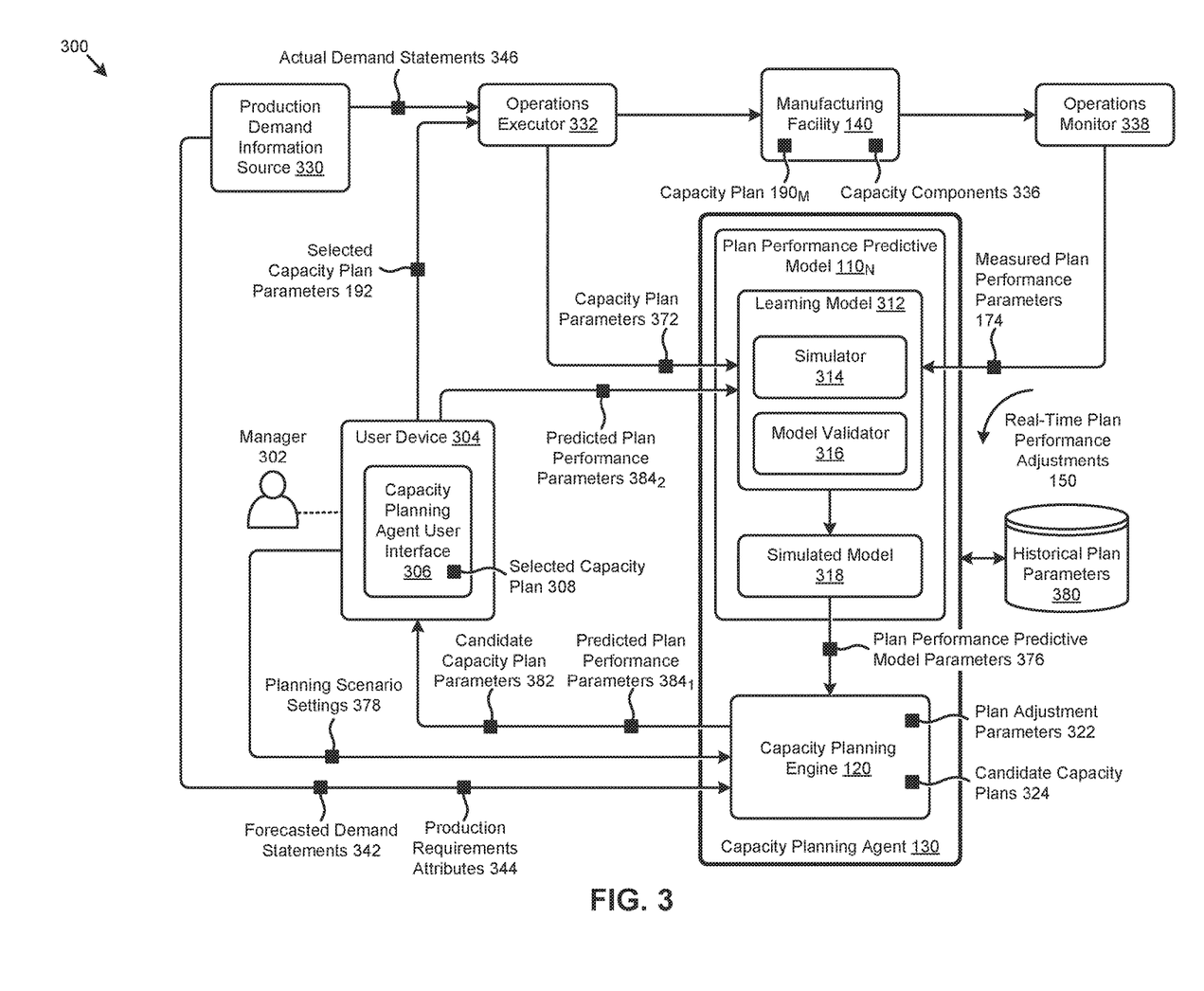
FIG. 3 illustrates a computing environment in which embodiments of the present disclosure can be implemented.

FIG. 3 illustrates a computing environment 300 in which embodiments of the present disclosure can be implemented. As an option, one or more variations of computing environment 300 or any aspect thereof may be implemented in the context of the architecture and functionality of the embodiments described herein. The computing environment 300 or any aspect thereof may be implemented in any other environment.

The computing environment 300 shown in FIG. 3 is merely one example representation of components, data flows, and data structures that can be implemented to facilitate the herein disclosed techniques. The components, data flows, and data structures shown in FIG. 3 present one partitioning and associated data manipulation approach. The specific example shown is purely exemplary, and other subsystems, data structures, and/or partitioning are reasonable.

As can be observed, a manager 302 (e.g., capacity planner) interacts with the capacity planning agent 130 using a capacity planning agent user interface 306 at a user device 304. In some cases, the capacity planning agent user interface 306 might be presented to manager 302 by a browser. In other cases, the capacity planning agent user interface 306 might be an application (e.g., "app") installed on the user device 304. The user device 304 can represent any number of user devices, such as a smart phone, a laptop computer, a desktop computer, a workstation, a server, a tablet, an equipment console, and/or other devices.

In shown embodiment, manager 302 submits certain planning scenario settings 378 to the capacity planning engine 120 of the capacity planning agent 130 to facilitate generation of one or more candidate capacity plans 324 by the capacity planning engine 120. For example, the manager 302 might specify a time period, a target facility, one or more objectives (e.g., minimize capital expenditures, minimize equipment configuration changes, etc.), one or more rules, and/or other settings that correspond to one or more planning scenarios. The capacity planning engine 120 further receives instances of forecasted demand statements 342 and/or production requirements attributes 344 from a production demand information source 330. For example, a time-series of outs-based unit quantities for a mix of products, and a set of static and/or temporal production requirements (e.g., materials, equipment, recipes, configurations, personnel, etc.) to build those products, might be provisioned from a customer ERP system. In certain embodiments, the demand information can be collected by another agent that is accessed by the capacity planning agent 130.

Furthermore, a set of plan performance predictive model parameters 376 (e.g., input variables, output variables, equations, equation coefficients, constants, mapping relationships, limits, constraints, etc.) describing the then-current instance of a plan performance predictive model (e.g., plan performance predictive model $110_N$) are exposed to the capacity planning engine 120, in accordance with the herein disclosed techniques. As earlier described, the plan performance predictive model and/or its associated model parameters are used to determine one or more modeled plan parameters 322 that are consulted when generating the candidate capacity plans 324 at the capacity planning engine 120. The modeled plan parameters 322 derived from the plan performance predictive model $110_N$ facilitate, at least in part, the real-time plan performance adjustments 150 that are achieved in accordance with the herein disclosed techniques. A set of candidate capacity plan parameters 382 and/or a set of predicted plan performance parameters $384_1$ for some or all of the candidate capacity plans 324 are delivered to the capacity planning agent user interface 306 for analysis by manager 302. For example, the foregoing parameters associated with the candidate capacity plans 324 might be used to render certain graphical elements (e.g., charts, graphs, tables, etc.) in a browser window to facilitate a comparison of the candidate capacity plans 324 by the manager 302.

The manager 302 can select a capacity plan from the candidate capacity plans 324 at the user interface. A set of selected capacity plan parameters 192 describing a selected capacity plan 308 are issued to an operations executor 332 for implementation at manufacturing facility 140. The operations executor 332 can comprise any number and/or type of resources (e.g., shop floor computing systems, equipment controllers, material handling personnel, equipment reconfiguration technicians, etc.) that work together to implement the selected capacity plan according to the selected capacity plan parameters 192. The operations executor 332 further receives then-current instances of actual demand statements 346 from the production demand information source 330 to facilitate implementation of the selected capacity plan. In some cases, the actual demand statements 346 may differ from the forecasted demand statements 342 that were earlier used to generated the selected capacity plan parameters 192. In these cases, the implemented capacity plan (e.g., capacity plan $190_M$) may or may not be different from the capacity plan selected by the manager 302.

A set of capacity plan parameters 372 that describe the implemented capacity plans (e.g., capacity plan $190_M$) at manufacturing facility 140 are accessible by the capacity planning agent 130. Further, instances of measured plan performance parameters 174 corresponding to the capacity plan $190_M$ implemented at the manufacturing facility 140 are continually recorded (e.g., tracked) by an operations monitor 338. At least some of the measured plan performance parameters 174 can correspond to fine-grained instances of capacity components 336 comprising the manufacturing facility 140. For example, performance parameters (e.g., state identifiers, utilization levels, etc.) might be captured for capacity components of varying granularity such as, full production lines, equipment cells, equipment options, software licenses, personnel, consumables, and/or other capacity components. Such capacity components may or may not be used to execute the capacity plan $190_M$ at manufacturing facility 140. Any of the foregoing parameters (e.g., capacity plan parameters 372, measured plan performance parameters 174, etc.) and/or other information are organized and/or stored in a set of historical plan parameters 380 for then-current and/or later access.

The plan performance predictive model $110_N$ can be formed using any machine learning techniques. For example, as can be observed, a learning model 312 can be formed to facilitate prediction of a particular response from a particular stimulus. Specifically, the learning model 312 is formed to predict certain plan performance characteristics in response to certain capacity plan attributes. One approach to training the learning model 312 uses a simulator 314 and a model validator 316, as shown. In this approach, the simulator 314 accesses various subsets of the capacity plan parameters 372 (e.g., the stimuli) to generate predicted responses that can be compared by the model validator 316 to respective subsets of the measured plan performance parameters 174. The outcomes of the foregoing comparisons are used to update the learning model 312 so as to establish accurate (e.g., as defined by certain criteria) capacity plan performance predictions. In some cases, certain instances of the predicted plan performance parameters $384_1$ (e.g., predicted plan performance parameters $384_2$ corresponding to selected capacity plans) are ingested by the learning model 312 to facilitate accuracy improvements. A simulated model 318 at the plan performance predictive model $110_N$ serves to capture the full range of capacity plan variations so as to facilitate performance predictions for various planning scenarios. Such techniques can also serve to establish response and performance limits.

The foregoing discussions include techniques for generating (e.g., forming) and/or adjusting a predictive model (e.g., plan performance predictive model $110_N$), which techniques are disclosed in further detail as follows.

Figure 4A:
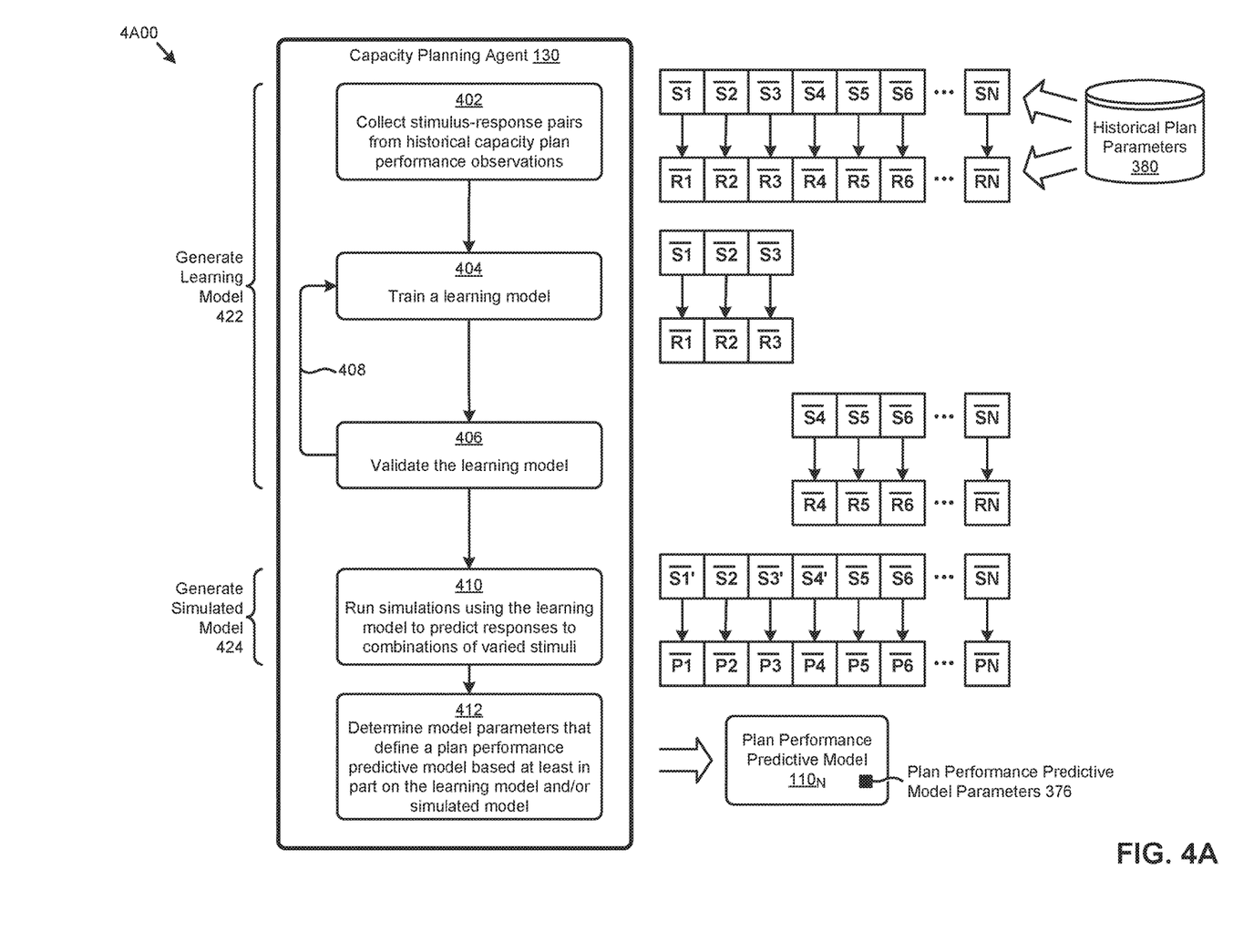
FIG. 4A presents a plan performance predictive model generation technique as implemented in systems that facilitate real-time adjustment of manufacturing capacity plans using predictive modeling, according to an embodiment.

FIG. 4A presents a plan performance predictive model generation technique 4A00 as implemented in systems that facilitate real-time adjustment of manufacturing capacity plans using predictive modeling. As an option, one or more variations of plan performance predictive model generation technique 4A00 or any aspect thereof may be implemented in the context of the architecture and functionality of the embodiments described herein. The plan performance predictive model generation technique 4A00 or any aspect thereof may be implemented in any environment.

The plan performance predictive model generation technique 4A00 presents one embodiment of certain steps and/or operations that facilitate real-time adjustment of manufacturing capacity plans using predictive modeling. At least some of the steps and/or operations (e.g., the grouping of steps to generate learning model 422) are performed to generate a learning model that is associated with the plan performance predictive model. In certain embodiments, at least some of the steps and/or operations presented can be performed by the capacity planning agent 130 earlier described. As illustrated, the plan performance predictive model generation technique 4A00 can commence by collecting various stimulus-response pairs from a set of historical capacity plan performance observations (step 402). For example, stimulus vectors $\overline{S1}$ through $\overline{SN}$ and response vectors $\overline{R1}$ through $\overline{RN}$, organized in one-to-one pairings, might be derived from various capacity plan parameters, measured plan performance parameters, predicted plan performance parameters, and/or other information stored in historical plan parameters 380. Each pair might correspond to an instance of the capacity plan implemented in a particular manufacturing facility.

A portion of the collected pairs (e.g., pairs $\overline{S1}$-$\overline{R1}$ through $\overline{S3}$-$\overline{R3}$) can be used to train one or more learning models (step 404). A different portion of the collected pairs (e.g., pairs $\overline{S4}$-$\overline{R4}$ through $\overline{SN}$-$\overline{RN}$) can be used to validate the learning model (step 406). The processes of training and validating can be iterated (see path 408) until the learning model behaves within target tolerances (e.g., with respect to predictive statistic metrics, descriptive statistics, significance tests, etc.). In some cases, additional historical stimulus-response pairs can be collected (e.g., from historical plan parameters 380) to further train the learning model.

When a learning model is established, certain steps and/or operations (e.g., the step to generate simulated model 424) of the plan performance predictive model generation technique 4A00 are performed to generate a simulated model that is associated with the plan performance predictive model. Specifically, simulations are run that apply varying stimuli (e.g., simulated variations) to the learning model so as to generate predicted responses to the varying stimuli (step 410). As shown in FIG. 4A, selected varied stimulus vectors (e.g., stimulus vectors $\overline{S1'}$, $\overline{S3'}$, and $\overline{S4'}$) might be applied with unvaried stimuli to the learning model to determine a set of predicted responses (e.g., predicted response vectors $\overline{P1}$ through $\overline{PN}$). By simulating a certain set of combinations of varied stimuli, a simulated model can be generated for a plan performance predictive model that serves to capture the full range of capacity plan variations so as to facilitate performance predictions for various possible planning scenarios. The parameters that define a plan performance predictive model are determined based at least in part on the learning model and/or simulated model (step 412). As an example, the plan performance predictive model parameters 376 of plan performance predictive model $110_N$ earlier described might be generated by plan performance predictive model generation technique 4A00.

Further details pertaining to techniques for adjustment of plan performance predictive models are disclosed as follows.

Figure 4B:
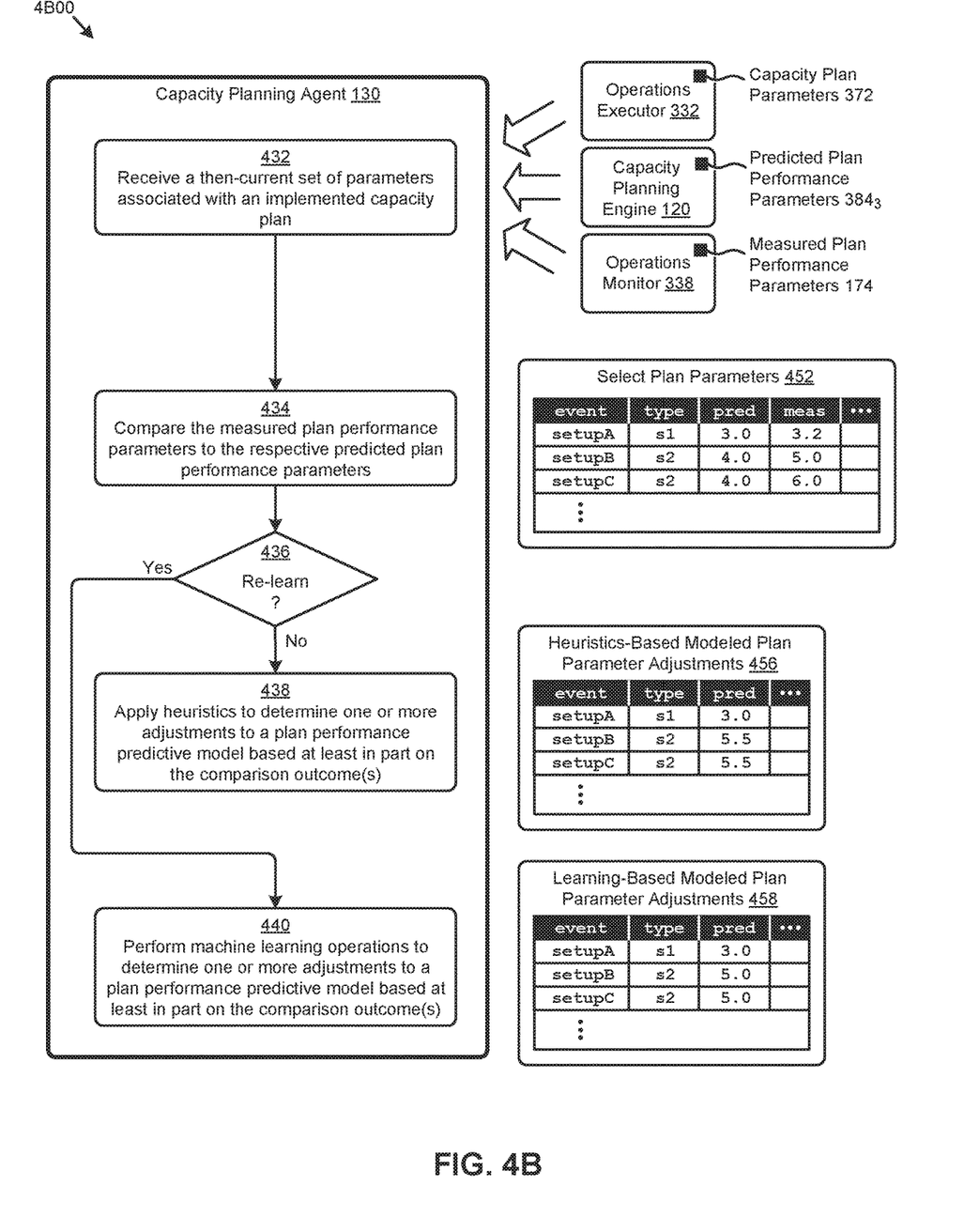
FIG. 4B presents a plan performance predictive model adjustment technique as implemented in systems that facilitate real-time adjustment of manufacturing capacity plans using predictive modeling, according to an embodiment.

FIG. 4B presents a plan performance predictive model adjustment technique 4B00 as implemented in systems that facilitate real-time adjustment of manufacturing capacity plans using predictive modeling. As an option, one or more variations of plan performance predictive model adjustment technique 4B00 or any aspect thereof may be implemented in the context of the architecture and functionality of the embodiments described herein. The plan performance predictive model adjustment technique 4B00 or any aspect thereof may be implemented in any environment.

The plan performance predictive model adjustment technique 4B00 presents one embodiment of certain steps and/or operations that facilitate real-time adjustment of manufacturing capacity plans using predictive modeling. In certain embodiments, at least some of the steps and/or operations presented in FIG. 4B can be performed by the capacity planning agent 130 earlier described. For example, the capacity planning agent 130 might apply the plan performance predictive model adjustment technique 4B00 to an instance of a plan performance predictive model accessed by the agent. The plan performance predictive model adjustment technique 4B00 can commence by receiving a then-current set of parameters associated with an implemented (e.g., then-currently executed) capacity plan (step 432). Such parameters might be received during execution of the capacity plan and/or shortly after execution of some or all of the capacity plan to facilitate real-time plan performance adjustments as described herein. As illustrated in FIG. 4B, the then-current parameters associated with an active capacity plan might include capacity plan parameters 372 from operations executor 332, predicted plan performance parameters $384_3$ from capacity planning engine 120, measured plan performance parameters 174 from operations monitor 338, and/or other parameters. The measured plan performance parameters from the received parameters are compared to respective predicted plan performance parameters from the received parameters (step 434). As indicated in a set of select plan parameters 452, the parameters being compared might comprise, capacity plan parameters that describe a planning event (e.g., stored in an "event" field) and an event type (e.g., stored in a "type" field), predicted plan performance parameters that specify a predicted value (e.g., time in hours) associated with the planning event (e.g., stored in a "pred" field), measured plan performance parameters that specify a measure value (e.g., time in hours) associated with the planning event (e.g., stored in a "meas" field), and/or other parameters. More specifically, the select plan parameters 452 indicate a measured value of "3.2" hours and a predicted valued of "3.0" hours for "setupA" are compared, a measured value of "5.0" hours and a predicted valued of "4.0" hours for "setupB" are compared, and a measured value of "6.0" hours and a predicted valued of "4.0" hours for "setupC" are compared.

Based at least in part the outcome of the comparison(s), a decision 436 is made to determine whether or not to perform re-learning at the plan performance predictive model. If no re-learning is to be invoked (see "No" path of decision 436), heuristics are applied to determine one or more adjustments to the plan performance predictive model based at least on the outcome of the comparison(s) (step 438). In some cases, heuristics might be applied rather than re-learning operations due to the expense (e.g., in terms of time, computing resources, etc.) of performing learning operations. Applying such heuristics might, for example, perform scalar adjustments to one or more of the parameters (e.g., constants, equation coefficients, etc.) of the plan performance predictive model so that the model produces modeled plan parameters that more accurately (e.g., with respect to predictive statistic metrics, descriptive statistics, significance tests, etc.) predict actual observations. In some cases, no adjustments might be made to the plan performance predictive model as pertains to certain modeled plan parameters. For example, the representative set of heuristics-based modeled plan parameter adjustments 456 indicate that no adjustment is made to the plan performance predictive model as pertains to modeled plan parameters associated with setup events of type "s1" (e.g., "setupA"). However, the heuristics-based modeled plan parameter adjustments 456 also indicate that the plan performance predictive model is adjusted as pertains to setup events of type "s2". Specifically, a heuristic is applied that adjusts the plan performance predictive model to predict a modeled plan parameter value for any event of type "s2" that is equal to the average of the measured parameters (e.g., "5.0" and "6.0" in select plan parameters 452). If re-learning is to be invoked (see "Yes" path of decision 436), machine learning operations are performed (e.g., over the plan performance predictive model) to determine one or more adjustments to the plan performance predictive model based at least on the outcome of the comparison(s) (step 440). Any applicable machine learning techniques, such as the techniques described herein, can be implemented to determine the adjustments. As shown in a representative set of learning-based modeled plan parameter adjustments 458, such learning techniques might disregard the measured value of "6.0" for event type "s 2" as an outlier and adjust to plan performance predictive model to predict a modeled plan parameter value of "5.0" for any event of type "s2".

Figure 5A:
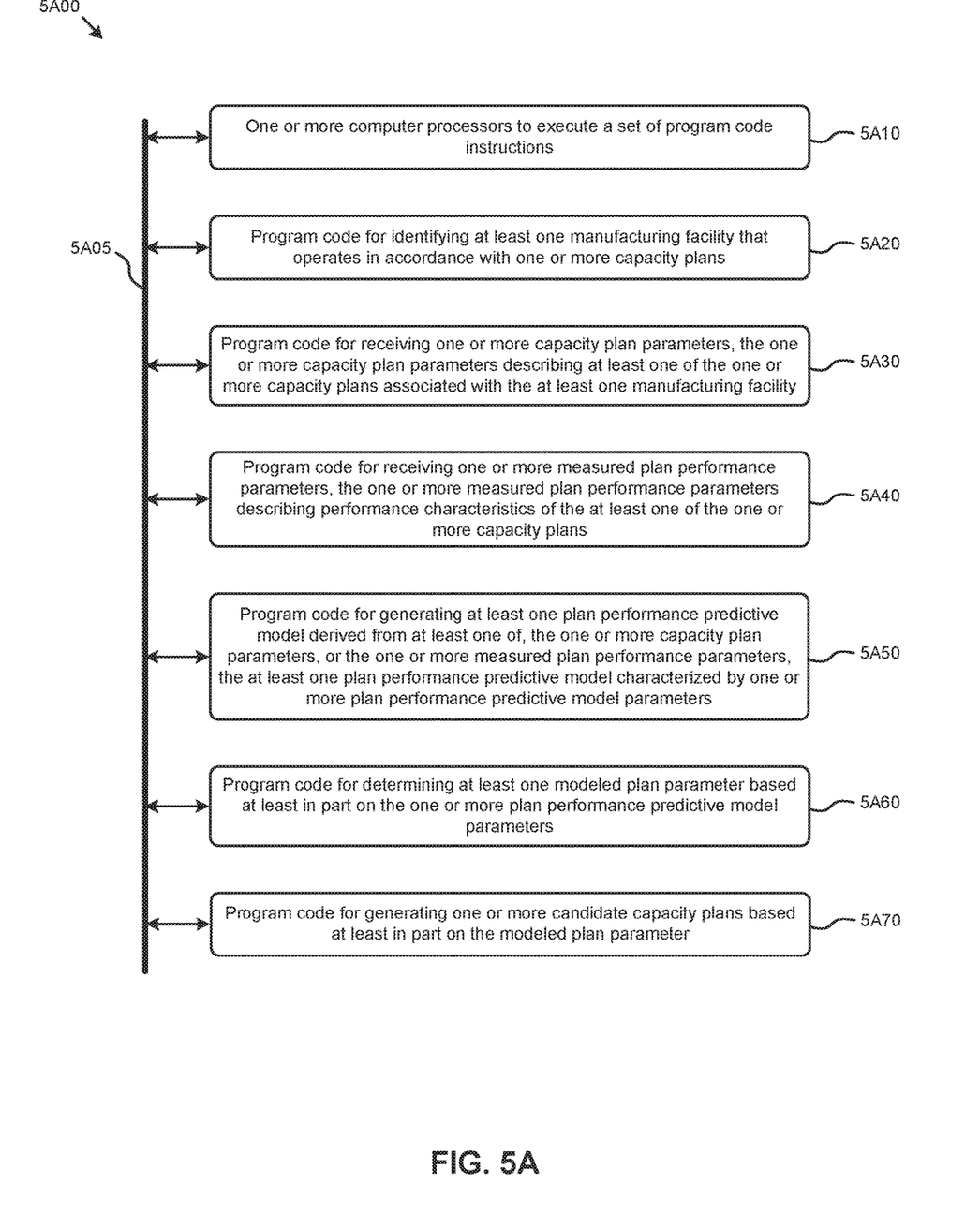
FIG. 5A and FIG. 5B depict system components as arrangements of computing modules that are interconnected so as to implement certain of the herein-disclosed embodiments.

Additional Embodiments of the Disclosure
Additional Practical Application Examples FIG. 5A depicts a system 5A00 as an arrangement of computing modules that are interconnected so as to operate cooperatively to implement certain of the herein-disclosed embodiments. This and other embodiments present particular arrangements of elements that, individually and/or as combined, serve to form improved technological processes that address implementing disaster recovery capabilities in two-node computing clusters. The partitioning of system 5A00 is merely illustrative and other partitions are possible.

The system 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with other operations over communication path 5A05. The modules of the system can, individually or in combination, perform method operations within system 5A00. Any operations performed within system 5A00 may be performed in any order unless as may be specified in the claims. The shown embodiment implements a portion of a computer system, presented as system 5A00, comprising a computer processor to execute a set of program code instructions (module 5A10) and modules for accessing memory to hold program code instructions to perform: identifying at least one manufacturing facility that operates in accordance with one or more capacity plans (module 5A20); receiving one or more capacity plan parameters, the one or more capacity plan parameters describing at least one of the one or more capacity plans associated with the at least one manufacturing facility (module 5A30); receiving one or more measured plan performance parameters, the one or more measured plan performance parameters describing performance characteristics of the at least one of the one or more capacity plans (module 5A40); generating at least one plan performance predictive model derived from at least one of, the one or more capacity plan parameters, or the one or more measured plan performance parameters, the at least one plan performance predictive model characterized by one or more plan performance predictive model parameters (module 5A50); determining at least one modeled plan parameter based at least in part on the one or more plan performance predictive model parameters (module 5A60); and generating one or more candidate capacity plans based at least in part on the modeled plan parameter (module 5A70).

Variations of the foregoing may include more or fewer of the shown modules. Certain variations may perform more or fewer (or different) steps and/or certain variations may use data elements in more or in fewer (or different) operations.

Figure 5B:
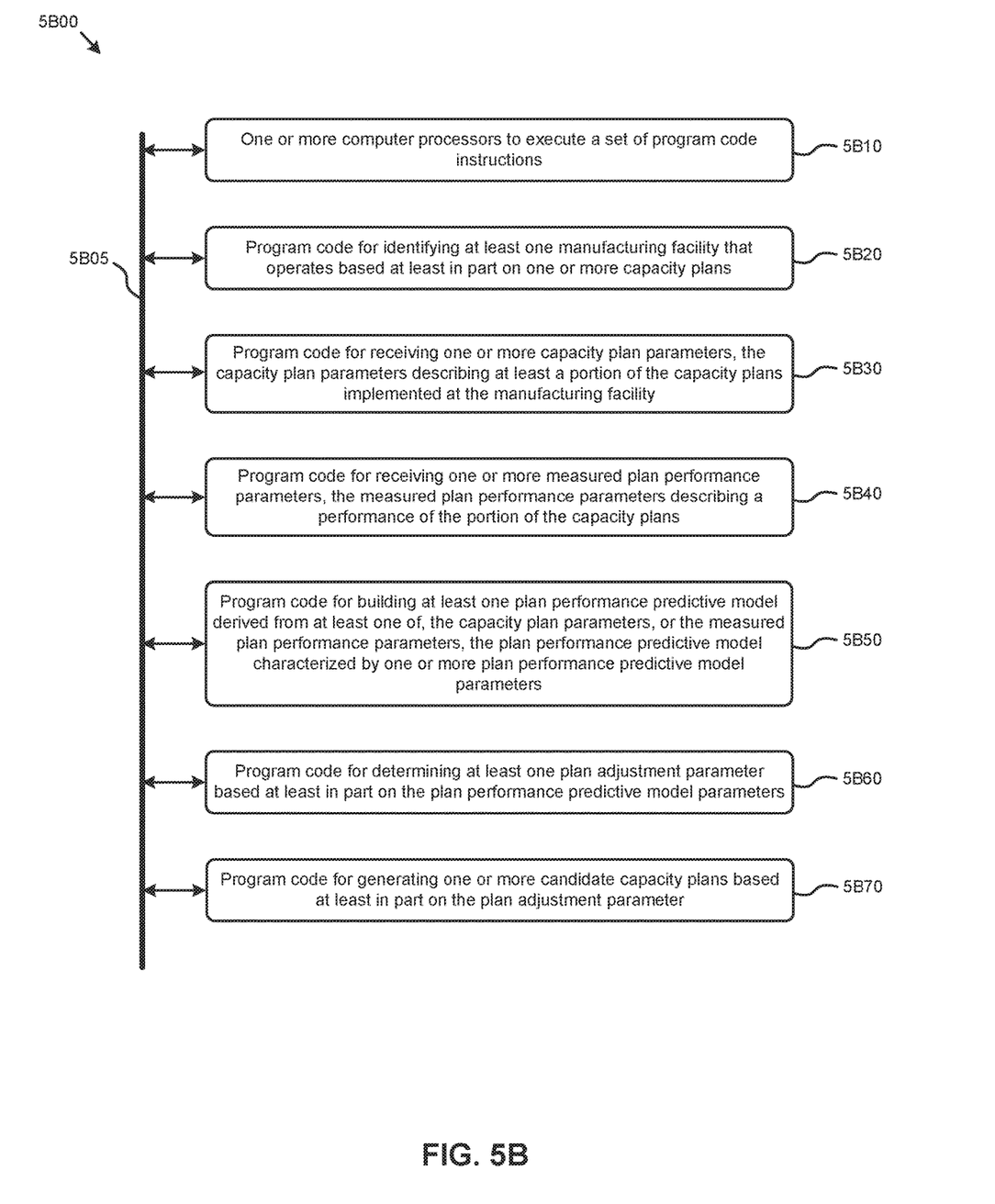

FIG. 5B depicts a system 5B00 as an arrangement of computing modules that are interconnected so as to operate cooperatively to implement certain of the herein-disclosed embodiments. The partitioning of system 5B00 is merely illustrative and other partitions are possible. As an option, the system 5B00 may be implemented in the context of the architecture and functionality of the embodiments described herein. Of course, however, the system 5B00 or any operation therein may be carried out in any desired environment.

The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with other operations over communication path 5B05. The modules of the system can, individually or in combination, perform method operations within system 5B00. Any operations performed within system 5B00 may be performed in any order unless as may be specified in the claims. The shown embodiment implements a portion of a computer system, presented as system 5B00, comprising a computer processor to execute a set of program code instructions (module 5B10) and modules for accessing memory to hold program code instructions to perform: identifying at least one manufacturing facility that operates based at least in part on one or more capacity plans (module 5B20); receiving one or more capacity plan parameters, the capacity plan parameters describing at least a portion of the capacity plans implemented at the manufacturing facility (module 5B30); receiving one or more measured plan performance parameters, the measured plan performance parameters describing a performance of the portion of the capacity plans (module 5B40); building at least one plan performance predictive model derived from at least one of, the capacity plan parameters, or the measured plan performance parameters, the plan performance predictive model characterized by one or more plan performance predictive model parameters (module 5B50); determining at least one plan adjustment parameter based at least in part on the plan performance predictive model parameters (module 5B60); and generating one or more candidate capacity plans based at least in part on the plan adjustment parameter (module 5B70).

System Architecture Overview
Additional System Architecture Examples

Figure 6:
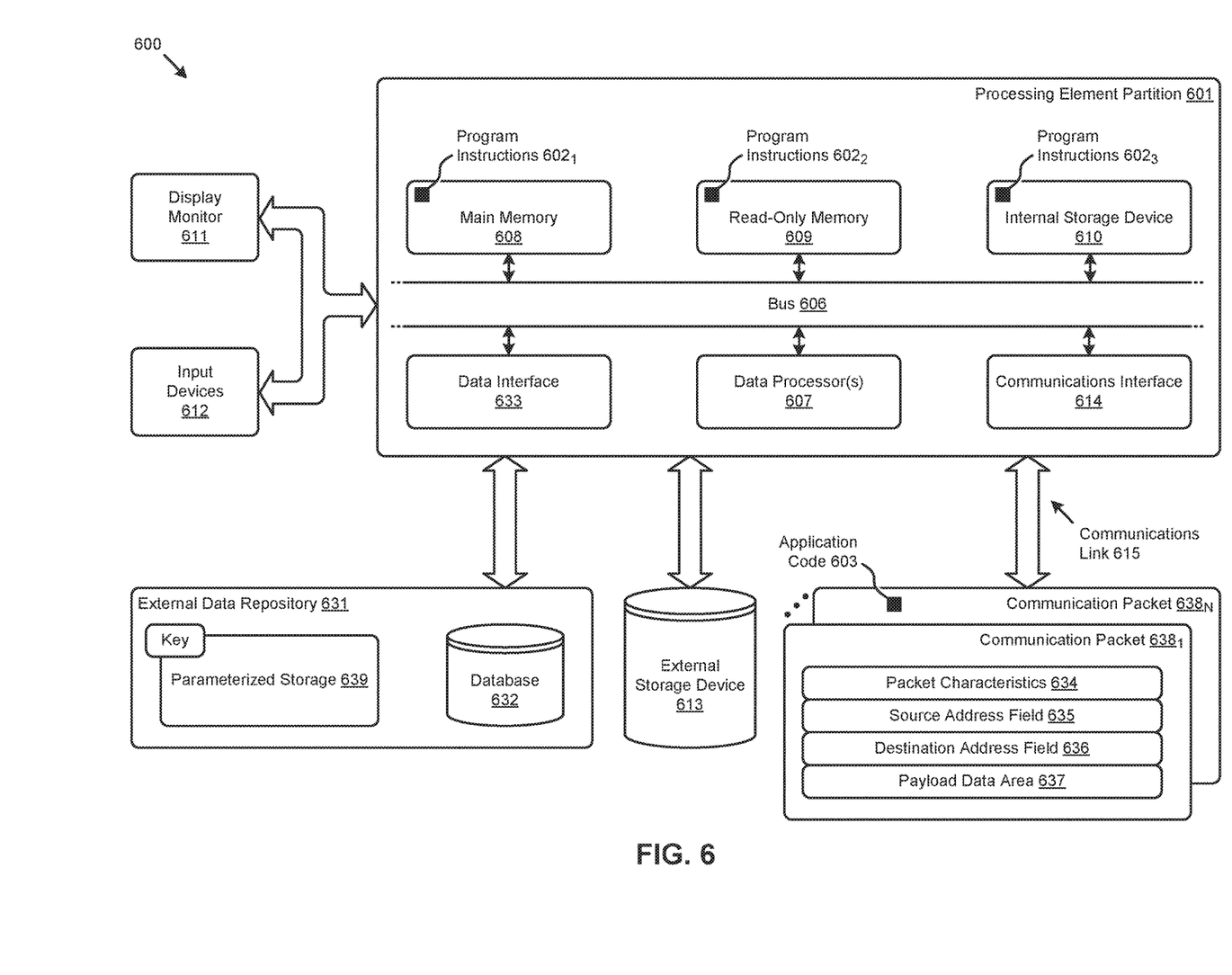
FIG. 6 presents a block diagram of a computer system architecture having components suitable for implementing embodiments of the present disclosure, and/or for use in the herein-described environments.

FIG. 6 depicts a block diagram of an instance of a computer system 600 suitable for implementing embodiments of the present disclosure. Computer system 600 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 600 further comprises a display 611 (e.g., CRT or LCD), various input devices 612 (e.g., keyboard, cursor control), and an external data repository 631.

According to an embodiment of the disclosure, computer system 600 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 600 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communication packets (e.g., communication packet $638_1$, . . . , communication packet $638_N$) comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 600. According to certain embodiments of the disclosure, two or more instances of computer system 600 coupled by a communications link 615 (e.g., LAN, PTSN, or wireless network) may perform the sequence of instructions required to practice embodiments of the disclosure using two or more instances of components of computer system 600.

The computer system 600 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 600 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to real-time adjustment of manufacturing capacity plans using predictive modeling. A module may include one or more state machines and/or combinational logic used to implement or facilitate the operational and/or performance characteristics pertaining to real-time adjustment of manufacturing capacity plans using predictive modeling.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of real-time adjustment of manufacturing capacity plans using predictive modeling). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to real-time adjustment of manufacturing capacity plans using predictive modeling, and/or for improving the way data is manipulated when performing computerized operations pertaining to implementing a predictive model that learns from real-time plan performance data to continually improve the accuracy of generated capacity plans.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for managing manufacturing capacity plan performance, the method performed by at least one computer and comprising:
identifying at least one manufacturing facility that operates in accordance with one or more capacity plans;
receiving one or more capacity plan parameters, the one or more capacity plan parameters describing at least one of the one or more capacity plans associated with the at least one manufacturing facility;
receiving one or more measured plan performance parameters, the one or more measured plan performance parameters describing performance characteristics of the at least one of the one or more capacity plans;
generating at least one plan performance predictive model derived from at least one of, the one or more capacity plan parameters, or the one or more measured plan performance parameters, the at least one plan performance predictive model characterized by one or more plan performance predictive model parameters;
determining at least one modeled plan parameter based at least in part on the one or more plan performance predictive model parameters; and
generating one or more candidate capacity plans based at least in part on the modeled plan parameter.

2. The method of claim 1, further comprising:
generating one or more predicted plan performance parameters, the one or more predicted plan performance parameters corresponding to the at least one of the one or more capacity plans.

3. The method of claim 2, further comprising:
exposing at least one of the one or more predicted plan performance parameters to the at least one plan performance predictive model to determine at least one of, the modeled plan parameter, or at least one of the one or more plan performance predictive model parameters.

4. The method of claim 2, further comprising:
comparing at least one of the one or more predicted plan performance parameters to at least one of the one or more measured plan performance parameters.

5. The method of claim 1, further comprising:
selecting at least one selected capacity plan from the one or more candidate capacity plans.

6. The method of claim 5, further comprising:
submitting one or more selected capacity plan parameters to implement the at least one selected capacity plan at the at least one manufacturing facility.

7. The method of claim 1, further comprising:
adjusting at least one of the one or more plan performance predictive model parameters based at least in part on one of, one or more heuristics, or one or more machine learning techniques.

8. The method of claim 1, wherein the one or more candidate capacity plans are based at least in part on at least one of, one or more planning scenario settings, one or more forecasted demand statements, one or more production requirements attributes, one or more capacity planning algorithms, or one or more of the one or more plan performance predictive model parameters.

9. The method of claim 1, wherein the one or more measured plan performance parameters correspond to one or more capacity components associated with the at least one manufacturing facility.

10. A computer readable medium, embodied in a non-transitory computer readable medium, the non-transitory computer readable medium having stored thereon a sequence of instructions which, when stored in memory and executed by one or more processors causes the one or more processors to perform a set of acts for managing manufacturing capacity plan performance, the set of acts comprising:
identifying at least one manufacturing facility that operates in accordance with one or more capacity plans;
receiving one or more capacity plan parameters, the one or more capacity plan parameters describing at least one of the one or more capacity plans associated with the at least one manufacturing facility;
receiving one or more measured plan performance parameters, the one or more measured plan performance parameters describing performance characteristics of the at least one of the one or more capacity plans;
generating at least one plan performance predictive model derived from at least one of, the one or more capacity plan parameters, or the one or more measured plan performance parameters, the at least one plan performance predictive model characterized by one or more plan performance predictive model parameters;
determining at least one modeled plan parameter based at least in part on the one or more plan performance predictive model parameters; and
generating one or more candidate capacity plans based at least in part on the modeled plan parameter.

11. The computer readable medium of claim 10, further comprising instructions which, when stored in memory and executed by the one or more processors causes the one or more processors to perform acts of:
generating one or more predicted plan performance parameters, the one or more predicted plan performance parameters corresponding to the at least one of the one or more capacity plans.

12. The computer readable medium of claim 11, further comprising instructions which, when stored in memory and executed by the one or more processors causes the one or more processors to perform acts of:
exposing at least one of the one or more predicted plan performance parameters to the at least one plan performance predictive model to determine at least one of, the modeled plan parameter, or at least one of the one or more plan performance predictive model parameters.

13. The computer readable medium of claim 11, further comprising instructions which, when stored in memory and executed by the one or more processors causes the one or more processors to perform acts of:
comparing at least one of the one or more predicted plan performance parameters to at least one of the one or more measured plan performance parameters.

14. The computer readable medium of claim 10, further comprising instructions which, when stored in memory and executed by the one or more processors causes the one or more processors to perform acts of:
selecting at least one selected capacity plan from the one or more candidate capacity plans.

15. The computer readable medium of claim 14, further comprising instructions which, when stored in memory and executed by the one or more processors causes the one or more processors to perform acts of:
submitting one or more selected capacity plan parameters to implement the at least one selected capacity plan at the at least one manufacturing facility.

16. The computer readable medium of claim 10, further comprising instructions which, when stored in memory and executed by the one or more processors causes the one or more processors to perform acts of:
adjusting at least one of the one or more plan performance predictive model parameters based at least in part on one of, one or more heuristics, or one or more machine learning techniques.

17. The computer readable medium of claim 10, wherein the one or more candidate capacity plans are based at least in part on at least one of, one or more planning scenario settings, one or more forecasted demand statements, one or more production requirements attributes, one or more capacity planning algorithms, or one or more of the one or more plan performance predictive model parameters.

18. The computer readable medium of claim 10, wherein the one or more measured plan performance parameters correspond to one or more capacity components associated with the at least one manufacturing facility.

19. A system for managing manufacturing capacity plan performance, the system comprising:
a storage medium having stored thereon a sequence of instructions; and
one or more processors that execute the sequence of instructions to cause the one or more processors to perform a set of acts, the set of acts comprising,
identifying at least one manufacturing facility that operates in accordance with one or more capacity plans;
receiving one or more capacity plan parameters, the one or more capacity plan parameters describing at least one of the one or more capacity plans associated with the at least one manufacturing facility;
receiving one or more measured plan performance parameters, the one or more measured plan performance parameters describing performance characteristics of the at least one of the one or more capacity plans;
generating at least one plan performance predictive model derived from at least one of, the one or more capacity plan parameters, or the one or more measured plan performance parameters, the at least one plan performance predictive model characterized by one or more plan performance predictive model parameters;
determining at least one modeled plan parameter based at least in part on the one or more plan performance predictive model parameters; and
generating one or more candidate capacity plans based at least in part on the modeled plan parameter.

20. The system of claim 19, wherein the one or more candidate capacity plans are based at least in part on at least one of, one or more planning scenario settings, one or more forecasted demand statements, one or more production requirements attributes, one or more capacity planning algorithms, or one or more of the one or more plan performance predictive model parameters.

* * * * *